(12) United States Patent
Hogate

(10) Patent No.: US 7,938,368 B2
(45) Date of Patent: May 10, 2011

(54) NOSECONE ICE PROTECTION SYSTEM FOR A GAS TURBINE ENGINE

(75) Inventor: Isaac Jon Hogate, Cromwell, CT (US)

(73) Assignee: United Technologies Corporation, Hartford, CT (US)

( * ) Notice: Subject to any disclaimer, the term of this patent is extended or adjusted under 35 U.S.C. 154(b) by 553 days.

(21) Appl. No.: 12/080,895

(22) Filed: Apr. 7, 2008

(65) Prior Publication Data

US 2010/0319358 A1    Dec. 23, 2010

(51) Int. Cl.
*B64D 15/16* (2006.01)

(52) U.S. Cl. ............ 244/134 A; 244/134 C; 244/134 B; 244/134 D; 244/134 E; 60/39.092

(58) Field of Classification Search ... 244/134 A–134 E; 60/39.092
See application file for complete search history.

(56) References Cited

U.S. PATENT DOCUMENTS

| | | | |
|---|---|---|---|
| 1,807,359 A | 5/1931 | Waters | |
| 2,680,345 A | 6/1954 | Frost | |
| 2,699,303 A * | 1/1955 | Chilman | 244/134 D |
| 3,183,975 A | 5/1965 | Keen | |
| 3,420,476 A | 1/1969 | Volkner et al. | |
| 3,834,157 A | 9/1974 | Hoffmann | |
| 4,021,008 A * | 5/1977 | Eichenauer | 244/134 D |
| 4,036,457 A | 7/1977 | Volkner et al. | |
| 4,485,619 A | 12/1984 | Moore et al. | |
| 4,546,604 A | 10/1985 | Moore et al. | |
| 4,738,416 A * | 4/1988 | Birbragher | 244/134 B |
| 4,941,317 A | 7/1990 | Ivey et al. | |
| 5,281,091 A | 1/1994 | Dooley et al. | |
| 5,314,145 A * | 5/1994 | Rauckhorst, III | 244/134 A |
| 5,351,918 A | 10/1994 | Giamati | |
| 5,489,073 A * | 2/1996 | Leffel et al. | 244/134 R |
| 5,657,951 A | 8/1997 | Giamati | |
| 5,657,952 A * | 8/1997 | Goldberg | 244/134 R |
| 5,947,418 A | 9/1999 | Bessiere et al. | |
| 6,129,314 A * | 10/2000 | Giamati et al. | 244/134 R |
| 6,279,856 B1 | 8/2001 | Rutherford et al. | |
| 6,330,986 B1 | 12/2001 | Rutherford et al. | |
| 6,503,056 B2 | 1/2003 | Eccles et al. | |
| 6,588,285 B1 | 7/2003 | Vozhdaev et al. | |
| 6,725,645 B1 | 4/2004 | Wadia et al. | |
| 7,124,983 B2 * | 10/2006 | Chow et al. | 244/134 D |
| 7,230,205 B2 | 6/2007 | Twerdochlib | |
| 7,246,480 B2 | 7/2007 | Ritland | |
| 2006/0280600 A1 | 12/2006 | Euvino et al. | |
| 2007/0187381 A1 | 8/2007 | Vontell et al. | |

FOREIGN PATENT DOCUMENTS

| | | |
|---|---|---|
| WO | WO 2005/073539 A1 | 8/2005 |
| WO | WO 2007/107732 A1 | 9/2007 |

* cited by examiner

*Primary Examiner* — Tien Dinh
*Assistant Examiner* — Justin Benedik
(74) *Attorney, Agent, or Firm* — Kinney & Lange, P.A.

(57) ABSTRACT

A system includes a first anti-icing electrothermal heater located at tip of a gas turbine engine nosecone, and a plurality of anti-icing electrothermal heater strips extending rearward from the first anti-icing electrothermal heater along the nosecone.

18 Claims, 3 Drawing Sheets

NOSECONE ICE PROTECTION SYSTEM FOR A GAS TURBINE ENGINE

STATEMENT OF GOVERNMENT INTEREST

The present invention was developed under contract no. N00019-02-C-3003 for the United States Department of the Navy. The U.S. Government has certain rights in this invention.

BACKGROUND

The present invention relates to ice protection systems for gas turbine engine nosecones.

Gas turbine engines for aerospace applications generally include a nose cone structure at a forward end where air enters the engine. During flight conditions, there is a risk of ice accumulation on the nosecone. Ice formation on the nosecone can dislodge and be ingested by the engine, potentially damaging the engine. Ice accumulation can also undesirably affect weight characteristics and aerodynamics at the nosecone.

Prior art solutions for ice protection have involved directing relatively warm engine bleed air into a hollow interior cavity of the nosecone for anti-icing purposes. The bleed air helps maintain the nosecone at a temperature that does not allow ice to form. One disadvantage of bleed air for nosecone anti-icing systems is that bleeding air from a primary engine flowpath represents an engine efficiency loss.

SUMMARY

A system includes a first anti-icing electrothermal heater located at tip of a gas turbine engine nosecone, and a plurality of anti-icing electrothermal heater strips extending rearward from the first anti-icing electrothermal heater along the nosecone.

DETAILED DESCRIPTION

In general, the present invention provides an electrothermal ice protection system for a gas turbine engine nosecone. The ice protection system utilizes a combination of substantially continuously heated anti-icing zones at a forward tip portion and along a plurality of spaced parting strips that extend rearward from the forward tip portion to a rear edge of an ice impingement zone. Between the parting strips are de-icing zones that are selectively heated to melt any ice that accumulates in those zones. The use of a combination of anti-icing and de-icing zones allows for relatively efficient use of electrical power while still providing a suitable level of ice protection for the nosecone. Moreover, three or more parting strips can be provided in an equally circumferentially spaced arrangement so as to prevent ice from forming as single sheet covering a 180° or greater circumferential portion of the nosecone. In one embodiment, electrothermal heaters are embedded in an interior surface of a nosecone made of composite material. As used herein, the term "anti-icing" refers to efforts to prevent ice from forming at selected areas, and the term "de-icing" refers to efforts to eliminate ice from selected areas.

Figure 1:
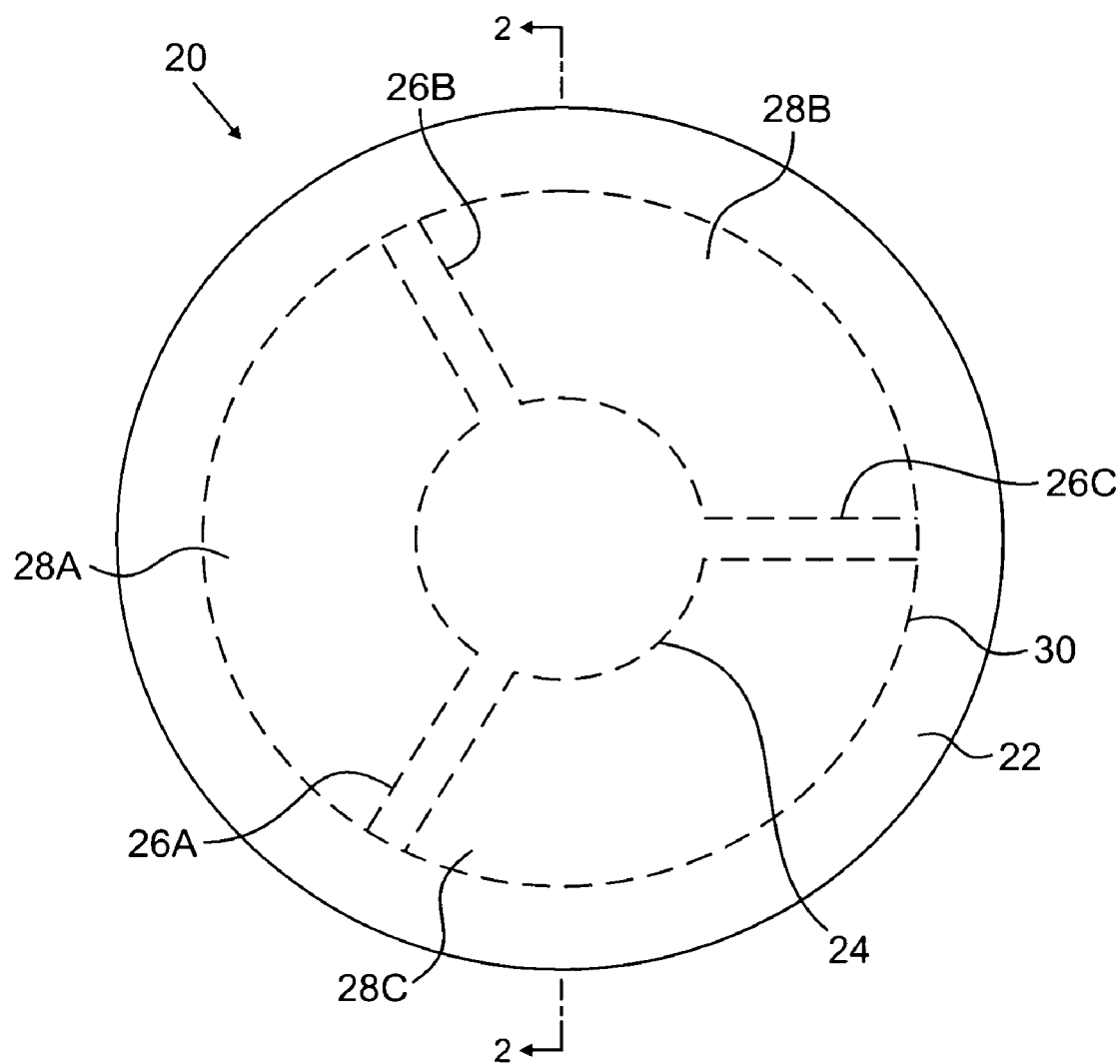
FIG. 1 is a front view of a nosecone ice protection system according to the present invention.
Figure 2:
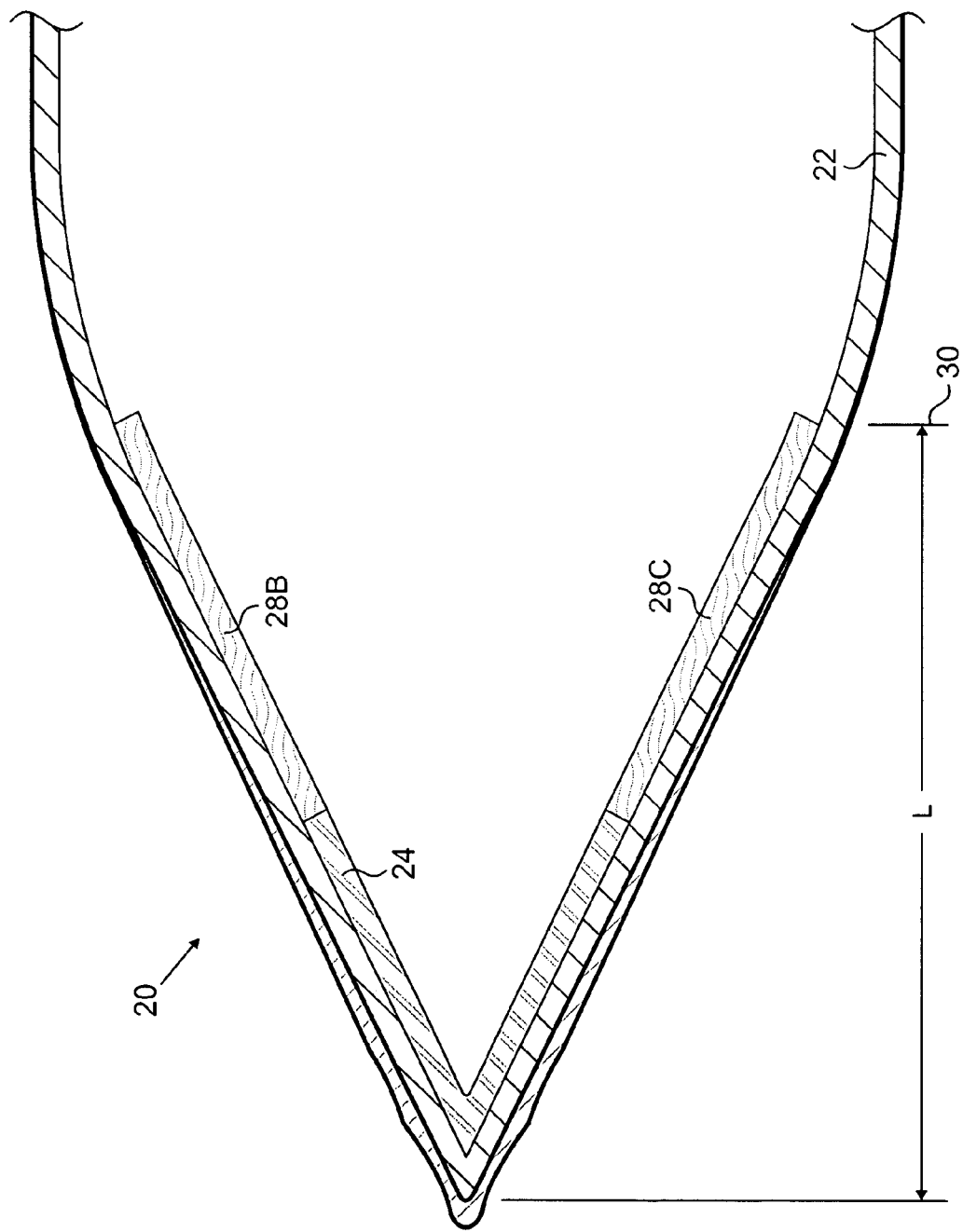
FIG. 2 is a cross-sectional view of the nosecone ice protection system, taken along line 2-2 of FIG. 1, with ice accretion shown for reference.

FIGS. 1 and 2 illustrate a nosecone ice protection system 20 for use with a gas turbine engine. FIG. 1 is a front view of the nosecone ice protection system 20, and FIG. 2 is a cross-sectional view of the nosecone ice protection system 20 taken along line 2-2 of FIG. 1. The system 20 includes a nosecone 22 and electrothermal heaters arranged in an anti-icing tip zone 24, a plurality of anti-icing parting strips 26A-26C, and a plurality of de-iced zones 28A-28C.

In the illustrated embodiment, the nosecone 22 is static (i.e., non-rotating), and is configured to be mounted along an engine centerline at the forward end of a gas turbine engine (not shown) for aerospace applications. The nosecone 22 can be made of a composite material molded to the desired shape. The particular shape of the nosecone 22 can vary as desired for particular applications. Airflow entering the gas turbine engine can impinge upon the nosecone 22. During some flight conditions, ice can impinge upon or otherwise tend to form on the nosecone 22. Generally, ice will impinge along the nosecone 22 through an impingement zone having a length L in the axial direction (FIG. 2). Absent an ice protection system, such ice can accumulate and then dislodge in large pieces that are ingested by the engine, which can undesirably lead to damage or wear to the engine.

In order to reduce ice accretion and ice-related damage, electrothermal heaters are employed according to the present invention in the anti-icing tip zone 24, the plurality of anti-icing parting strips 26A-26C, and the plurality of de-iced zones 28A-28C. The electrothermal heaters can be embedded in the composite material along interior surfaces of the nosecone 22. Each electrothermal heater element can be of a conventional type, for instance, each can be formed as from a spray metal resistive layer disposed on fiberglass webs. Suitable electrothermal heater mats can be obtained from GKN plc., Redditch, United Kingdom. Such electrothermal heater mats are then embedded in the nosecone 22 during molding of the nosecone 22 in a type of overmolding process whereby the electrothermal heater mats are epoxied directly to the nosecone 22.

In order to reduce overall electrical power demands, the system 20 is broken into anti-icing and de-icing zones. The electrothermal heaters in the anti-icing tip zone 24 and the anti-icing parting strips 26A-26C operate to substantially continuously provide heat during engine operation or at least during flight. As shown for merely illustrative purposes in FIG. 2, ice accretion along the nosecone 22 tends to be greatest, that is, thickest, at a forward tip portion of the nosecone 22 (though in operation the ice protection system 20 would tend to prevent the illustrated ice accretion). The anti-icing tip zone 24 continuously provides heat at a location where ice accretion is relatively high, thereby reducing a risk that ice is ever formed there on the nosecone 22, and any ice that does form or impinge that area would be melted relatively quickly. The size of the anti-icing tip zone 24 is selected as a function of the distribution of anticipated ice impingement for a given shape of the nosecone 22, where there is generally the greatest risk of ice impingement and accretion. The axial length of the anti-icing tip portion 24 as shown in the embodiment in FIG. 2 is less than the length L of the ice impingement zone that extends along the nosecone 22, which reduces the power expenditure required by the anti-icing tip portion 24.

There is a risk that fluid downstream from the anti-icing tip zone 24 can undesirably freeze or refreeze on the nosecone 22. In order to reduce ice accretion downstream of the anti-icing tip zone 24, elongate electrothermal heater strips form a number of circumferentially-spaced anti-icing parting strips 26A-26C that extend from the anti-icing tip portion 24 to a downstream (or aft) limit 30 of the ice impingement zone. The circumferential width of the anti-icing parting strips 26A-26C can vary as desired for particular applications. In the illustrated embodiment the three anti-icing parting strips 26A-26C are substantially equally circumferentially spaced from each other at angles of about 120°. It should be understood that the number and spacing of the anti-icing parting strips 26A-26C can vary as desired, however, it is generally desirable to provide at least three anti-icing parting strips 26A-26C to prevent the formation of a sheet of ice that covers a circumferential surface of the nosecone 22 that is greater than or equal to 180°.

De-icing zones 28A-28C that extend from the anti-icing tip zone 24 to the downstream limit 30 of the ice impingement zone are provided between each of the anti-icing parting strips 26A-26C. These de-icing zones 28A-28C are selectively powered on and off by a controller according to a duty cycle to periodically de-ice regions of the nosecone 22 as a function of air conditions, including air temperature and air flow at the nosecone 22 (see FIG. 3). Air condition data can be obtained from a main engine controller, which conventionally will already collect and make available such data. In one embodiment, the duty cycle powers the set of electrothermal heaters for all of the de-icing zones 28A-28C simultaneously at approximately one minute intervals. By powering all of the de-icing zones 28A-28C together, the number of wires needed by the system 20 can be reduced. In an alternative embodiment, a different one of the de-icing zones 28A-28C is powered at each duty cycle interval (e.g., every one minute). In this embodiment, power consumption can further be reduced.

A gap, sized as small as possible and filled with a non-electrically conductive material, is present between the anti-icing zone 24 and the anti-icing parting strips 26A-26C on the one hand and the de-icing zones 28A-28C on the other hand, in order to electrically insulate the electrothermal heaters for the anti-icing and de-icing zones and parting strips.

Figure 3:
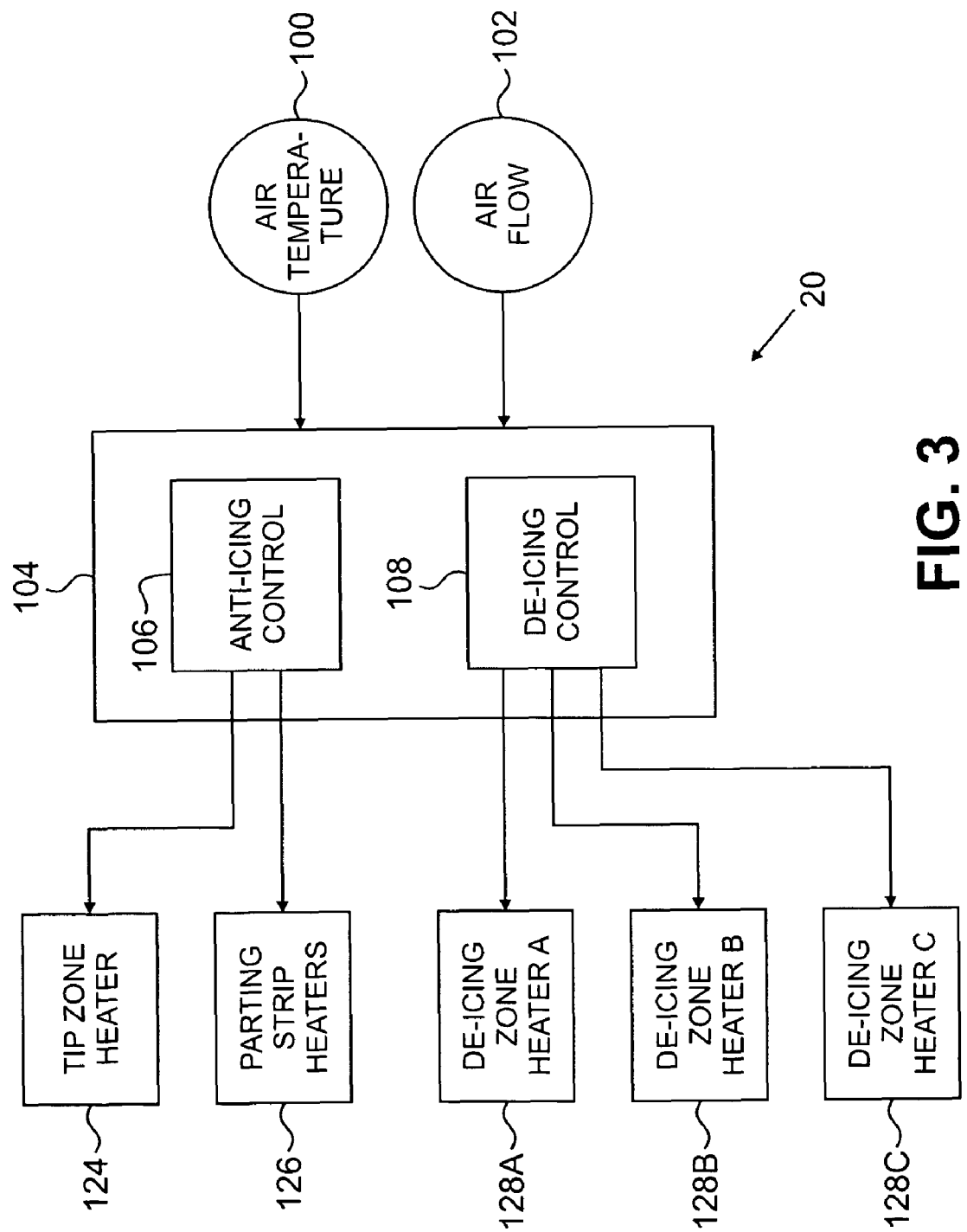
FIG. 3 is a block diagram of the ice protection system.

FIG. 3 is a block diagram of the ice protection system 20. As shown in FIG. 3, air temperature data 100 and air flow data 102 are sent (e.g., from a main engine controller) to a controller 104 that includes both anti-icing control circuitry 106 and de-icing control circuitry 108. The anti-icing control circuitry 106 controls the operation of a tip zone heater 124 and a plurality of parting strip heaters 126. The de-icing control circuitry 108 controls the operation of a plurality of de-icing zone heaters 128A-128C. In the exemplary configuration shown in FIG. 3, the tip zone heater 124 and the plurality of parting strip heaters 126 can be controlled separately from the plurality of de-icing zone heaters 128A-128C to achieve different ice protection modes at different locations along a nosecone.

It should be recognized that the present invention provides numerous advantages. For example, the present invention provides an electrically powered ice protection system for a nosecone of a gas turbine engine that can operate on a relatively small electrical power budget. Furthermore, the present invention allows electrothermal heaters to be embedded in a composite nosecone. The electrothermal heaters can be embedded along interior surfaces of the nosecone, which provides protection to the heaters from foreign object damage (FOD) and wear.

Although the present invention has been described with reference to preferred embodiments, workers skilled in the art will recognize that changes may be made in form and detail without departing from the spirit and scope of the invention. For instance, although the present invention is described with respect to static (i.e., non-rotating) nosecones, the present invention could be applied to rotating nosecones as well with the use of slip-rings or other means.

What is claimed is:

1. A system comprising:
a first anti-icing electrothermal heater located at a tip of a gas turbine engine nosecone; and
a plurality of anti-icing electrothermal heater strips extending rearward from the first anti-icing electrothermal heater along the nosecone, wherein the plurality of anti-icing electrothermal heater strips are circumferentially spaced from each other, and wherein regions of the nosecone between adjacent anti-icing electrothermal heater strips and rearward of the first anti-icing electrothermal heater encompass less than 180° to limit ice from forming as single sheet
covering a 180° or greater circumferential portion of the nosecone; and
a set of second de-icing electrothermal heaters defining selectively heatable regions located on the nosecone between each of the plurality of anti-icing electrothermal heater strips and rearward of the first anti-icing electrothermal heater at the tip, wherein at least one of the selectively heatable regions extends rearward to an aft extent of an ice impingement zone of the nose cone.

2. The system of claim 1, wherein the set of second de-icing electrothermal heaters defining the selectively heatable regions are configured to selectively provide heat during engine operation to de-ice the nosecone.

3. The system of claim 2, wherein the first heater and the plurality of anti-icing electrothermal heater strips are configured to substantially continuously provide heat during engine operation.

4. The system of claim 1, wherein the first anti-icing electrothermal heater is configured to substantially continuously provide heat during engine operation.

5. The system of claim 1, wherein the plurality of anti-icing electrothermal heater strips are configured to substantially continuously provide heat during engine operation.

6. The system of claim 1, wherein at least one of the plurality of anti-icing electrothermal heater strips extends rearward to an aft extent of an ice impingement zone of the nosecone.

7. The system of claim 1, wherein the plurality of anti-icing electrothermal heater strips include at least three heater strips.

8. The system of claim 1, wherein the plurality of anti-icing electrothermal heater strips are substantially equally circumferentially spaced.

9. A system comprising:
a first electrothermal heater located at a tip of a nosecone of a gas turbine engine for providing anti-icing at the tip;
a plurality of circumferentially spaced electrothermal heater strips extending rearward from the tip of the nosecone for providing anti-icing at locations rearward of the tip, wherein regions of the nosecone between adjacent electrothermal heater strips and rearward of the first electrothermal heater encompass less than 180° to limit ice from forming as single sheet covering a 180° or greater circumferential portion of the nosecone; and
a set of second electrothermal heaters defining selectively heatable regions located between each of the plurality of electrothermal heater strips and rearward of the tip for providing de-icing of the selectively heatable regions.

10. The system of claim 9, wherein at least one of the selectively heatable regions extends rearward to a rear edge of an ice impingement zone of the nosecone.

11. The system of claim 10, wherein the set of second electrothermal heaters defining the selectively heatable regions are configured to selectively provide heat during engine operation to de-ice the nosecone.

12. The system of claim 11, wherein the first electrothermal heater and the plurality of electrothermal heater strips are configured to continuously provide heat during engine operation.

13. The system of claim 9, wherein the first electrothermal heater is configured to continuously provide heat during engine operation.

14. The system of claim 9, wherein the plurality of electrothermal heater strips are configured to continuously provide heat during engine operation.

15. The system of claim 9, wherein at least one of the plurality of electrothermal heater strips extends rearward to an aft extent of an ice impingement zone of the nosecone.

16. The system of claim 9, wherein the plurality of electrothermal heater strips include at least three elongate electrothermal heater strips.

17. A method comprising:
    heating a forward tip region of a nosecone of a gas turbine engine substantially continuously during engine operation to provide anti-icing protection;
    heating a plurality of elongate regions extending rearward from the tip region substantially continuously during engine operation to provide anti-icing protection, wherein the elongate regions are configured to limit ice from forming as single sheet covering a 180° or greater circumferential portion of the nosecone; and
    temporarily heating regions defined between the plurality of elongate regions for de-icing.

18. The method of claim 17, wherein the step of heating the plurality of elongate regions provides heat from the tip portion to a rear limit of an ice impingement zone along the nosecone.

* * * * *